No. 890,333. PATENTED JUNE 9, 1908.
N. D. CHARD & M. SHIPLEY.
VARIABLE SPEED MECHANISM.
APPLICATION FILED JUNE 24, 1907.

2 SHEETS—SHEET 1.

No. 890,333. PATENTED JUNE 9, 1908.
N. D. CHARD & M. SHIPLEY.
VARIABLE SPEED MECHANISM.
APPLICATION FILED JUNE 24, 1907.
2 SHEETS—SHEET 2.
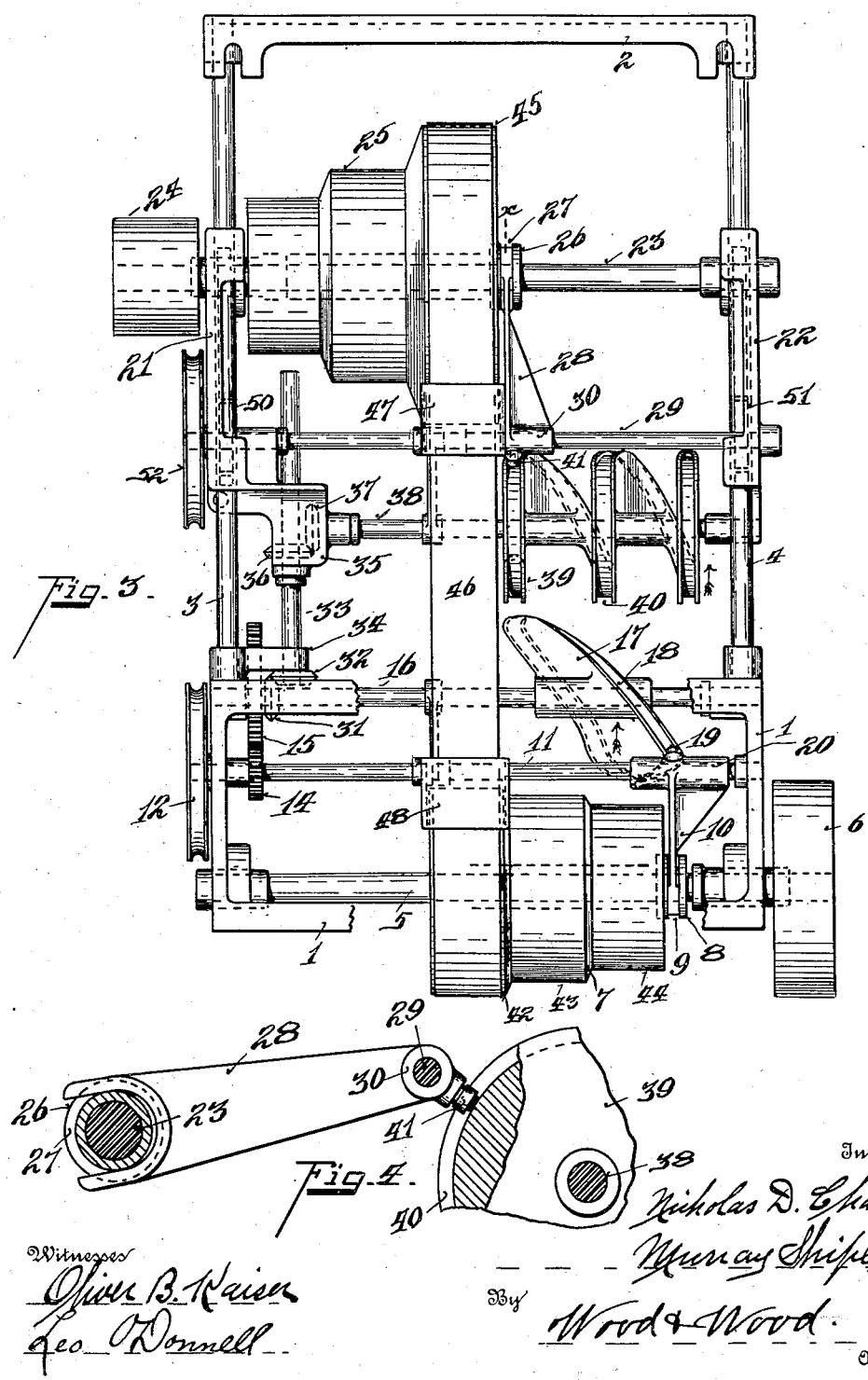

ical elevation of our improved
UNITED STATES PATENT OFFICE.

NICHOLAS D. CHARD AND MURRAY SHIPLEY, OF CINCINNATI, OHIO, ASSIGNORS TO THE LODGE & SHIPLEY MACHINE TOOL COMPANY, OF CINCINNATI, OHIO, A CORPORATION.

VARIABLE-SPEED MECHANISM.

No. 890,333.  Specification of Letters Patent.  Patented June 9, 1908.

Application filed June 24, 1907. Serial No. 380,617.

*To all whom it may concern:*

Be it known that we, NICHOLAS D. CHARD and MURRAY SHIPLEY, citizens of the United States, residing at Cincinnati, in the county of Hamilton and State of Ohio, have invented certain new and useful Improvements in Variable-Speed Mechanism, of which the following is a specification.

Our invention relates to an improvement in a speed variator, as shown it is primarily adapted for a counter shaft, but it may be employed for various other uses.

One of the objects of our invention is to provide means for laterally shifting a cone pulley, say the driving member, independent of the transmission elements of the driven member, and in which the belt for transmitting power from one to the other is maintained in a constant plane.

Another object of our invention is to provide means whereby a pair of cone pulleys is shifted laterally by one instrumentality.

Another object of our invention is to provide means for keeping the belt taut in its engagement with the different diameter pulleys.

Another object of our invention is to provide means for laterally shifting a pair of cone pulleys, whereby the speeds obtainable are equal in number to the square of the number of steps comprised in one of the cones.

Another object of our invention is to provide means for laterally shifting a pair of cone pulleys serially in step movements.

Another object of our invention is to provide means whereby the cone pulleys are independently or simultaneously shifted serially in gradually increasing or decreasing ratios.

Other various objects and advantages of the mechanism will be more fully set forth in the description of the accompanying drawings, forming a part of this specification, in which:—

Figure 1:
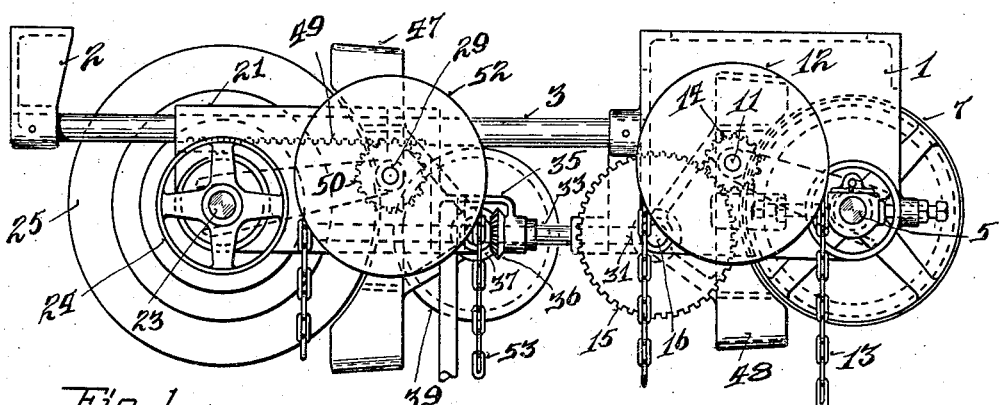
Figure 2:
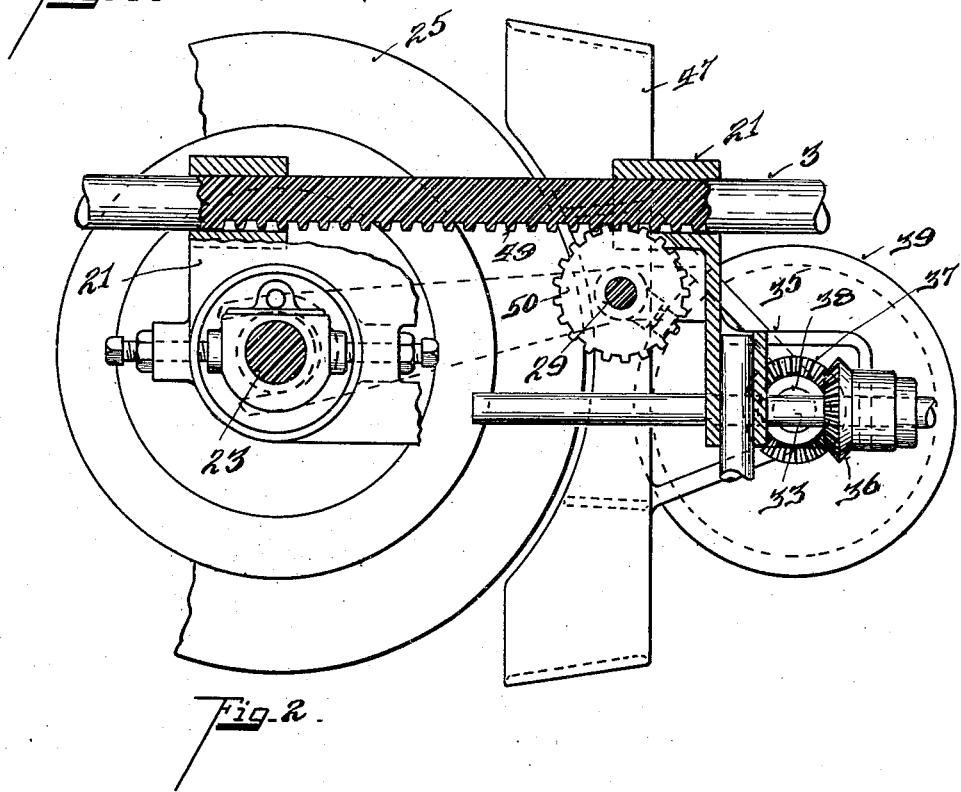

Figure 1 is a side elevation of our improved speed variator as applied to a counter shaft. Fig. 2 is an enlarged detailed sectional elevation showing the means for compensating for different lengths of belt. Fig. 3 is a top plan view of the shaft. Fig. 4 is a section on line *x* Fig. 3 showing the mechanism for shifting one of the cone pulleys.

1, 2, represent hanger frames forming the main supports of the counter shaft, which may be suitably attached to the ceiling. 3, 4, represent connecting rods or tubes fixed to bosses formed in the hangers 1, 2. This frame structure can be formed in one piece, but it is advantageous to provide two hangers connected by tie rods, said tie rods forming supports upon which sliding frames carrying the belt compensating mechanism are mounted. Either one of the shafts carrying the cone pulleys may be used as a driver.

5 represents a shaft journaled in boxes supported in the frame 1, provided with a transmission pulley 6, preferably placed outside of the frame proper.

7 represents a cone pulley slidably keyed upon the shaft 5, one end provided with a sleeve extension 8, having a peripheral groove 9 to receive the limbs of the yoke shifting arm 10.

11 represents a shaft journaled within the frame 1, its outer end provided with a chain wheel 12 carrying a chain 13 for rotating the shaft 11 in either direction to effect the proper shifting of the cone pulleys. This chain wheel and chain are used when the counter shaft is suspended from a ceiling.

14 represents a gear fixed to shaft 11 and in mesh with a gear 15, fixed upon shaft 16, said shaft being journaled within the frame 1.

17 represents a cam wheel, provided with a peripheral groove 18 in which a roller 19 travels, said roller projecting from the sleeve 20 of the yoke arm 10, said sleeve 20 being slidably mounted upon the shaft 11. The cam wheel 18 is of such formation as to laterally shift the cone pulley 7 a full movement upon a half turn of said cam wheel 17, the function of which will be more fully hereinafter described.

21, 22, represent sliding frames, slidably mounted upon the rods 3, 4, respectively, forming supports for the opposite cone pulley 25 and its belt compensating and shifting mechanisms.

23 represents a shaft journaled in boxes fixed to the sliding frames 21, 22.

24 represents a power transmission pulley fixed to the shaft 23.

25 represents a cone pulley slidably mounted upon the shaft 23 and fixed to turn therewith; it is provided with an extended sleeve portion 26 having a peripheral groove 27 to receive the limbs of the yoke arm 28.

29 represents a shaft suitably journaled in the sliding frames 21, 22, upon which the sleeve portion 30 of the yoke arm 28 is slidably mounted.

The lateral shifting of the cone pulley 25 intermittently, relative to the cone pulley 7, is accomplished by the following instrumentalities:—31 represents a beveled gear fixed to the shaft 16, in mesh with a beveled gear 32, fixed to the shaft 33, (see Fig. 3), one end of said shaft being supported and journaled upon a bracket extension 34, formed integral with the frame 1, the opposite end being journaled in a bracket projection 35, formed integral with the sliding frame 21. 36 represents a beveled gear splined upon the shaft 33, and adapted to move with the sliding frame 21, when the latter is shifted. 37 represents a beveled gear in mesh with gear 36, fixed to shaft 38, supported and journaled by the sliding frames 21, 22. 39 represents a cam wheel fixed upon said shaft 38, provided with an annular groove 40, in which a roller 41 travels. Said roller is journaled to and projected from the sleeve 30 of the yoke arm 28. This cam wheel 39 is of such construction that it will have idle movement without shifting the cone pulley 25, in order to enable said pulley 25 to remain in one position during the continuous actuation of the cam wheel 39, while the pulley 7 is being shifted, one step at a time, bringing the different diameters of the cone pulley 7 into position, until the entire number of steps of pulley 7 have been shifted in a given direction. The system of gearing for transmitting motion from shaft 16 to shaft 38, is so arranged that a half revolution of cam wheel 17 will shift the cone pulley 7 its entire distance in one direction, and the shifting of cone pulleys 25 will not commence until the cone pulley 7 commences to move its first step in the opposite direction. The movement of cone pulley 25 in such instance will be simultaneous with the movement of cone pulley 7 in this initial movement either to the right or left. The groove 18 of cam 17 is continuous, while the groove 40 of cam wheel 39 is limited, that is, the cam wheel 17 can be continuously revolved in one direction and a lateral shifting of the cone pulley 7 from one side to the other can be accomplished, while the cam wheel 39 is limited in such rotation to the number of steps of the cone pulley 25, when the action of the cam wheel 39 will have to be reversed to move the pulley wheel 25 in the opposite direction.

Assuming the cam wheels 17 and 39 are moving in the direction shown by arrows, Fig. 3, the different steps 42, 43, 44, of the cone pulley 7 can be shifted so as to bring the different diameter faces into transmitting relation with the face 45 of the cone pulley 25. The cone pulley 25 remains in the position shown in the drawings, and with said pulley 25 in such position three changes of speed can be imparted. Such action would bring the roller 41 to its limit of travel in the cam groove 40, and to make a second change, assuming that the cone pulley 7 has been moved to its extreme left position, the rotation of the cam wheels would necessarily have to be reversed when the system of changes could again serially be carried out, and in a counter shaft having a pair of cone pulleys of three steps.

It will be seen that the cam 17 has a continuous peripheral cam groove, and one revolution of the cam will move the cone pulley 7 from one position of its extreme movement to its opposite position and return the same. The cam 39 is of such construction that during its rotation it will cause an intermittent shifting of cone pulley 25. One half a revolution of cam 17 will cause the pulley 7 to move from one extreme position to its opposite position, while one half revolution of cam wheel 39 will either cause the pulley 25 to remain idle, if that portion of its peripheral surface is presented to the yoke arm 28, or will move the cone pulley 25 one step to the right or left, according to the direction of rotation of the cam wheel. Therefore it can be seen that the three steps of the cone pulley 7 are individually brought into driving relation with the belt, while the cone pulley 25 remains idle upon one half revolution of both cams, and by completing the revolution, or rather, making a full revolution of the cams, pulley 25 will be moved one step, and pulley 7 will be moved three steps. This would give nine changes of speed.

46 represents a belt for transmitting power from one cone pulley to the other. This belt is preferably held in a given position against lateral movement by the belt guides 47, 48, suitably mounted upon the shafts 29, 38, and 11, 16, respectively, against lateral movement but do not effect the rotation of said shafts. To shift the sliding frames 21, 22, to keep the belt taut, the following instrumentalities are employed:—The connecting rods 3, 4, are provided with rack teeth 49, see Figs. 1 and 2, into which the rack gears 50, 51, mesh, said rack gears being fixed to the shaft 29. 52 represents a chain wheel fixed to the shaft 29 carrying a chain 53 for imparting motion to said shaft. Thus by pulling one end of the chain 53 the sliding frame 21 can be moved in the desired direction for tightening the belt 46.

Having described our invention, we claim:—

1. In a variable speed device, two shafts, a cone of pulley wheels slidable on each shaft, a belt, means for holding it in a constant plane, and means for laterally shifting the said cones, whereby the speeds obtainable are equal in number to the square of the number of pulleys comprised in one of the cones, substantially as described.

2. In a variable speed device, two shafts, a cone of pulley wheels slidable on each shaft, a belt, means for holding it in a constant plane, means for laterally shifting the said cones, whereby the speeds obtainable are equal in number to the square of the number of pulleys comprised in one of the cones, and means for keeping the belt taut, substantially as described.

3. In a variable speed device, two shafts, a cone of pulley wheels slidable on each shaft, a belt means for holding it in a constant plane, means for laterally shifting the said cones, whereby the speeds obtainable are equal in number to the square of the number of pulleys comprised in one of the cones, and means for keeping the belt taut, substantially as described.

4. In a variable speed device, two shafts, means for moving the same to and from one another, a slidable pulley wheel on each shaft, a belt maintained in a constant plane, and means for shifting each cone, substantially as described.

5. In a variable speed device, two shafts, means for moving the same to and from one another, a slidable cone pulley wheel on each shaft, a belt maintained in a constant plane, means for shifting each cone, and means for simultaneously shifting said opposing cones intermittently in step movements, substantially as described.

6. In a variable speed device, two shafts, a slidable pulley cone on each shaft, a belt maintained in constant plane, cams geared together and having connections with their respective slidable cones, whereby when the cams are rotated the cones may be shifted into a number of positions of engagement with the belt, equal to the square of the number of pulleys contained in one of the cones, substantially as described.

7. In a variable speed device, two shafts, a slidable pulley cone on each shaft, a belt maintained in constant plane, cams geared together, provided with differential cam surfaces and connections between each cam and its respective pulley cone, adapted to laterally shift the cones simultaneously and intermittently into a number of positions of engagement with the belt, equal to the square of the number of pulleys comprised in one of the cones, substantially as described.

8. In a variable speed device, two shafts, a cone of pulley wheels slidable on each shaft, a belt for transmitting power from one pulley to the other, and means for independently and simultaneously shifting said cone pulleys, relative to the belt for effecting variations of speed, substantially as described.

9. In a variable speed device, two shafts, a cone of pulley wheels slidable on each shaft, a belt for transmitting power from ene pulley to the other, and means for independently and simultaneously shifting said cone pulleys relative to the belt for obtaining varied speed ratios, substantially as described.

10. In a variable speed device, two shafts, a wheel of graduated diameters slidable on each shaft, a belt for transmitting power from one wheel to the other, and means for independently and simultaneously shifting said wheels, relative to the belt for effecting variations of speed, substantially as described.

In testimony whereof, we have hereunto set our hands.

NICHOLAS D. CHARD.
MURRAY SHIPLEY.

Witnesses:
   OLIVER B. KAISER,
   LEO O'DONNELL.